United States Patent [19]
Belcher et al.

[11] Patent Number: 5,528,405
[45] Date of Patent: Jun. 18, 1996

[54] POWER SERIES CORRECTION IN A LINEAR FIBER OPTIC ANALOG TRANSMISSION SYSTEM AND METHOD

[75] Inventors: Donald K. Belcher, Melbourne; David M. Thomas, Malabar, both of Fla.

[73] Assignee: Harris Corporation, Melbourne, Fla.

[21] Appl. No.: 369,113

[22] Filed: Jan. 5, 1995

[51] Int. Cl.$^6$ ............................................. H04B 10/08
[52] U.S. Cl. ........................... 359/110; 359/161; 359/124
[58] Field of Search .......................... 359/110–111, 124, 359/161; 250/205; 324/624

[56] References Cited

U.S. PATENT DOCUMENTS

| | | | |
|---|---|---|---|
| 4,160,157 | 7/1979 | Freeborn | 250/199 |
| 4,726,011 | 2/1988 | Ih et al. | 359/127 |
| 4,989,201 | 1/1991 | Glance | 359/133 |
| 5,050,967 | 9/1991 | Hong | 359/111 |
| 5,073,983 | 12/1991 | Pfizenmayer | 359/187 |
| 5,161,044 | 11/1992 | Nazarathy et al. | 359/157 |
| 5,184,244 | 2/1993 | Nishimura et al. | 359/187 |
| 5,293,545 | 3/1994 | Huber | 359/111 |

*Primary Examiner*—Leo Boudreau
*Assistant Examiner*—Kinfe-Michael Negash
*Attorney, Agent, or Firm*—Rogers & Killeen

[57] ABSTRACT

A method and system for improving the linearity of an analog transmission in a multichannel fiber optic transmission system uses a power series correction derived from a non-information bearing portion of a received transmission. A notch filter reduces the energy in a portion of a guard band between channels before transmission so that the energy in the notch-filtered portion of the received transmission is indicative of the non-linearities introduced by the analog transmission system. The energy of the notch-filtered portion of a received transmission is represented by a power series that is inverted and provided as a correction to the received transmission.

20 Claims, 1 Drawing Sheet

5,528,405

POWER SERIES CORRECTION IN A LINEAR FIBER OPTIC ANALOG TRANSMISSION SYSTEM AND METHOD

BACKGROUND OF THE INVENTION

The present invention relates to systems and methods for improving the linearity of an analog transmission, and more particularly to a system and method in which a power series correction is applied to a transmission received on a fiber optic cable to reduce non-linearities in the received transmission.

The use of fiber optic systems is increasing, in part because fiber optic cables are able to provide the bandwidth needed for transmission of a multiplicity of information signals. The information signals may be digital or analog, with analog signals being preferred in many applications because of the relatively lower costs and lower power requirements of analog equipment. However, as is known, analog systems may introduce non-linearities into the received transmission because of the high transmission amplification levels that are typically needed to assure reception of the transmission with sufficient strength. The non-linearities cause distortions that may be manifested as crosstalk in multichannel systems that has heretofore been difficult to remove from the received transmission.

Multichannel fiber optic systems carry information signals in channels that are separated from one another by non-information bearing portions, denoted guard bands. An example of a multichannel fiber optic system is one in which the transmissions are frequency division multiplexed.

It is an object of the present invention to provide a novel method and system for improving the linearity of an analog transmission that obviates the problems of the prior art.

It is another object of the present invention to provide a novel method and system for improving the linearity of an analog transmission in which a power series correction is applied to a received transmission.

It is yet another object of the present invention to provide a novel method and system for improving the linearity of an analog transmission in which the energy of a non-information bearing portion of a received transmission is measured and provided as a power series correction to a received transmission.

It is still another object of the present invention to provide a novel method and system for improving the linearity of an analog transmission in which a notch filter reduces the energy in a guard band between channels in a multichannel fiber optic transmission system and in which the energy of the notch-filtered portion of a received transmission is measured and provided as a power series correction to an information signal in a received transmission.

It is a further object of the present invention to provide a novel method and system for improving the linearity of an analog transmission in which the energy in a guard band between channels in a multichannel fiber optic transmission system is measured and in which an inversion of a power series representation of the measured energy is a linearity correction for a received transmission.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
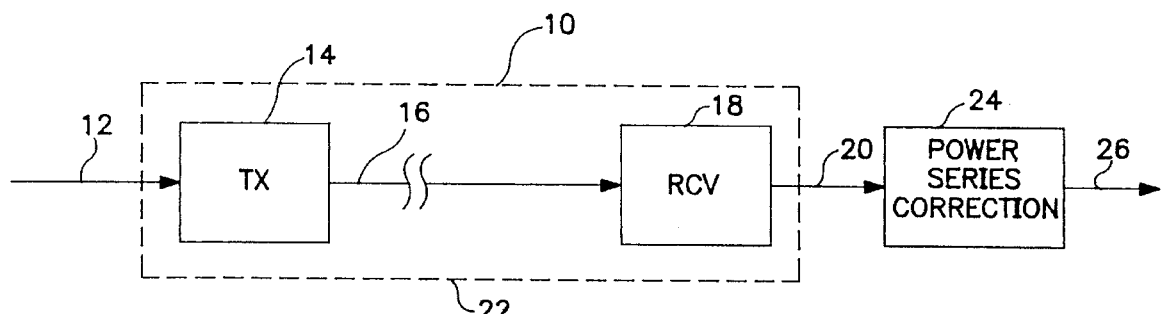
FIG. 1 is a block diagram of an embodiment of the system of the present invention.
Figure 2:
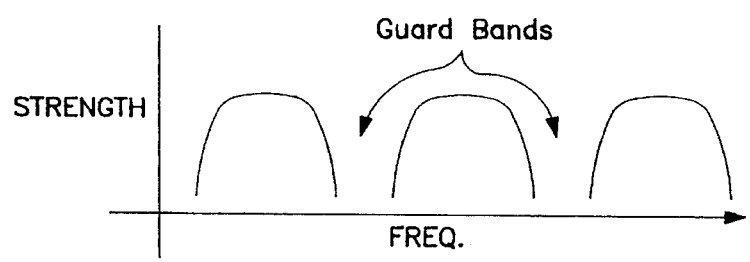
FIG. 2 is a graphical depiction of frequency versus signal strength that illustrates the separation of channels.

With reference to FIG. 1, an embodiment 10 of the system of the present invention may include an input 12 for carrying a transmission that includes multiple channels that are separated from one another by a portion that does not convey information (e.g., a guard band such as illustrated in FIG. 2) and does not have any significant non-linearities, a transmitter 14, a fiber optic cable 16, a receiver 18 that provides a received transmission 20 that includes the original transmission with non-linearities introduced by the system portion 22 (i.e., transmitter 14, cable 16, and/or receiver 18), and a device 24 for removing, or at least reducing, the non-linearities in the received transmission 20 so as to provide an output 26 that is generally free of significant non-linearities.

The device 24 may measure energy in a non-information bearing portion (e.g., a guard band) of the received transmission 20 and evaluate the measured energy relative to the amount of energy in that portion before transmission that is known or is calculable. The device 24 may thereafter provide a power series representative of the difference in measured energy, and correct the received transmission 20 by inverting the power series and combining the inversion with a power series representation of the information signals in the received transmission 20 to reduce non-linearities in the received transmission.

Figure 3:
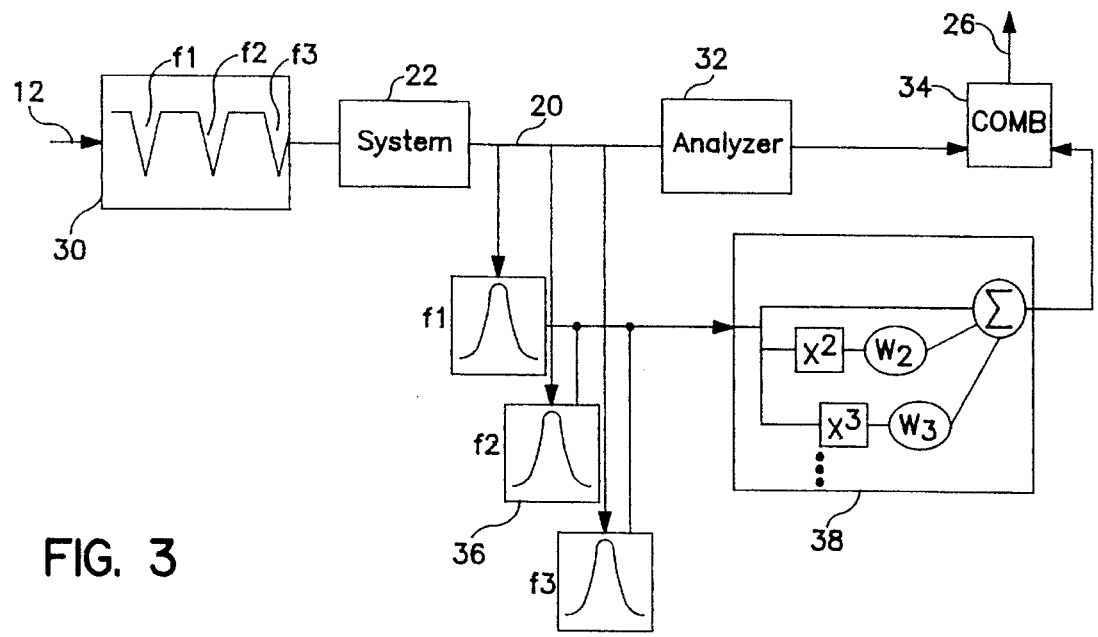
FIG. 3 is a block diagram of a further embodiment of the present invention.

In a preferred embodiment, and with reference to FIG. 3 (in which reference numbers from FIG. 1 have been retained in the interest of clarity), one or more notch filters 30 may excise energy from portions of the guard bands between channels in a fiber optic transmission system. By using notch filters to remove the energy from portions of the guard bands, the subsequent measurement of energy in the guard bands can be used directly without subtracting a known or calculable amount of energy. Three notch filters $f_1$, $f_2$, and $f_3$ may be used for low, middle, and high frequency portions of the guard band. When more than one notch filter 30 is used, the energy in the plural filters may be averaged, or otherwise combined to calculate the power series coefficients.

The energy in the information signals of a transmission received at the receiver 18 may be measured by conventional analyzer 32 and provided as a first power series representative of the measured energy in the information signals to a combiner 34. The energy in the notch-filtered portion of the transmission received at the receiver may be measured in conventional analyzers 36 and provided to a processor 38 that produces a second power series representative of the filtered section measured energy that is thereafter provided to the combiner 34. The combiner 34 may be conventional and may combine the first and second power series to provide a third power series representative of a modified received transmission in which non-linearities are reduced.

Operation may be more clearly understood by considering that an analog system is designed to be linear, but has imperfections and may be thought of as weakly non-linear. A transfer function representing the energy in a weakly non-linear transmission may be expressed as a power series:

$$y = f(x) = x + k_2 x^2 + k_3 x^3 + \ldots$$

This power series may be corrected (cleansed of non-linearities) by forming a new power series of the received signal. The weights of this new power series may be determined by measuring the energy in portion of a received transmission that did not include energy (or included a known or calculable amount of energy) when transmitted. For example, a guard band between channels has a known or calculable amount of energy upon transmission, and the energy in the guard band may be measured upon receipt to determine the energy added by the intervening elements. The energy added by the intervening elements is the result of the non-linearities in the system and may be represented by a power series.

An optimization routine may be used to minimize the amount of measured energy by adjusting the coefficients in the power series, and by adding higher orders of correction (e.g., fourth power, fifth power, etc.). Conventional techniques, desirably a negative gradient method or an analytical method, may be used to determine the coefficients in the power series. In the negative gradient method the processor 38 may perturb each coefficient and compute a vector of sensitivities that are used to adapt the system to a more linear state.

In the negative gradient methods, the nature of the non-linearity is assumed to be unknown. In a preferred embodiment, all that is available is measurement of the energy in the notch-filtered portions. From this information, it is possible to estimate the weight function which will minimize the energy found in the notches. Assume a nonlinearity of the form:

$$y=f(x)=x+a_1 x^2+a_2 x^3+ \ldots$$

To find a function which will invert this series, define, $$g(y)=w_1 y+w_2 y^2+w_3 y^3+ \ldots$$

and choose $\{w_1\}$ the set of weights such that, $$g(f(x))=x$$

By way of further explanation, assume a second order nonlinearity for $f(x)$. That is, $$f(x)=x+ax^2$$

A third order inverse function can be written as:

$$g(y)=y-ay^2+2a^2 y^3$$

then, $$g(f(x))=x+5a^3 x^4+6a^4 x^5+2a^5 x^6$$

For "a" small and "x" less than one, this expression reduces to "x". Increasing the order of $g(y)$ will lead to better performance. In the previous example, it was found that $w_1=1$, $w_2=-a$ and $w_1=2a^2$. To generalize this, define, $$x=\begin{pmatrix} a_1 \\ a_2 \\ \cdot \\ \cdot \\ \cdot \\ a_N \end{pmatrix}, w=\begin{pmatrix} w_1 \\ w_2 \\ \cdot \\ \cdot \\ \cdot \\ w_M \end{pmatrix}, F=\begin{pmatrix} F_1 \\ F_2 \\ \cdot \\ \cdot \\ \cdot \\ F_M \end{pmatrix}$$

Also define, $$F'(w)=\begin{pmatrix} \frac{\partial F_1}{\partial w_1} & \frac{\partial F_1}{\partial w_2} & \cdots & \frac{\partial F_1}{\partial w_M} \\ \frac{\partial F_2}{\partial w_1} & \frac{\partial F_2}{\partial w_2} & \cdots & \frac{\partial F_2}{\partial w_M} \\ \cdot & \cdot & \cdot & \cdot \\ \cdot & \cdot & \cdot & \cdot \\ \cdot & \cdot & \cdot & \cdot \\ \frac{\partial F_M}{\partial w_1} & \frac{\partial F_M}{\partial w_2} & \cdots & \frac{\partial F_M}{\partial w_M} \end{pmatrix}$$

Each of the terms in this derivative matrix are estimated numerically by means of small variations in $w_1$. Once this derivative matrix has been determined, the next step taken is a Newton or equivalent step. This is given by the solution of the matrix equation, $$F'(w_{old})(w_{new}-w_{old})=-F(w_{old})$$

Once convergence occurs (which may be to a non-global minimum) iteration stops and the final weights are saved. These weights may be updated periodically.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of improving the linearity of information signals in a fiber optic transmission system in which adjacent channels are separated by a guard band that is not provided with energy from the information signals when the information signals are transmitted, the method comprising the steps of:
   (a) measuring energy in the information signals of a received transmission;
   (b) providing a first power series representative of the measured energy in the information signals;
   (c) measuring energy in the guard band of a received transmission, the guard band measured energy being indicative of non-linearities in the received transmission;
   (d) providing a second power series representative of the guard band measured energy; and
   (e) combining the first and second power series to provide a third power series representative of a modified received transmission in which non-linearities are reduced.

2. The method of claim 1 further comprising the step of filtering the guard band with a notch filter to reduce energy in the notch-filtered section before the information signals are transmitted, and wherein the guard band measured energy represented by the second power series is the energy in the notch-filtered section.

3. The method of claim 2 wherein the guard band is filtered with plural of the notch filters, and wherein the guard band measured energy represented by the second power series is related to the energy in the plural notch-filtered sections.

4. The method of claim 1 wherein the second power series is inverted before being combined with the first power series to provide a power series function that minimizes guard band measured energy.

5. The method of claim 3 with three of the notch filters.

6. A method of improving the linearity of information signals in a fiber optic transmission system wherein transmissions include the information signals and non-information bearing portions, the method comprising the steps of:

(a) measuring energy of a non-information bearing portion of a received transmission;

(b) providing a power series representative of the measured energy; and (c) correcting a received transmission with an inversion of the power series whereby non-linearities in the received transmission are reduced.

7. The method of claim 6 wherein the non-information bearing portions comprise guard bands between channels carrying the information portions.

8. The method of claim 6 further comprising the steps of measuring energy in the information signals of the received transmission, and providing a further power series representative of the measured energy in the information signals, and wherein the step of correcting a received transmission comprises the step of combining the inversion of the power series and the further power series to provide a third power series representing a modification of the received transmission in which non-linearities are reduced.

9. An apparatus for improving the linearity of transmission of information signals in a multichannel fiber optic transmission system in which adjacent channels are separated by a guard band that is not provided with energy from the information signals, the apparatus comprising:

a filter for reducing energy in a filtered section of the guard band before the information signals are transmitted from a transmitter;

means for measuring energy in the information signals of a transmission received at a receiver;

means for providing a first power series representative of the measured energy in the information signals;

means for measuring energy in the filtered section of the transmission received at the receiver, the filtered section measured energy being indicative of non-linearities in the received transmission;

means for providing a second power series representative of the filtered section measured energy; and means for combining the first and second power series to provide a third power series representative of a modified received transmission in which non-linearities are reduced.

10. The apparatus of claim 9 wherein said filter comprises plural notch filters, each of said notch filters for providing one said filtered section.

11. The apparatus of claim 10 wherein the second power series provided by said means for providing the second power series is related to the energy in the plural notch-filtered sections.

12. The apparatus of claim 10 wherein said filter comprises three of said notch filters.

13. The apparatus of claim 9 wherein said means for combining the first and second power series comprises means for inverting the second power series before the second power series is combined with the first power series.

14. An apparatus for improving the linearity of an analog transmission in a multichannel fiber optic transmission system comprising:

means for measuring energy in a guard band between channels in the multichannel fiber optic transmission system;

means for inverting a power series representation of the measured energy; and means for correcting nonlinearities in a received transmission with the inverted power series representation.

15. The apparatus of claim 14 further comprising a notch filter for excising energy from a portion of the guard band, and wherein said means for measuring energy measures the energy in the notch-filtered portion of the received transmission.

16. An apparatus for improving the linearity of signals received in a fiber optic transmission system, the signals having information bearing portions and non-information bearing portions, the apparatus comprising:

first means for measuring energy in non-information bearing portions of signals received in the fiber optic transmission system;

second means for providing a power series representation of the energy measured by said first means; and third means for correcting nonlinearities in the received signals with the power series representation from said second means.

17. The apparatus of claim 16 further comprising fourth means for measuring energy in information bearing portions of the received signals, and fifth means for providing a further power series representation of the energy measured by said fourth means, and wherein said third means comprises means for combining the power series and the further power series to provide a third power series representing a modification of the received signal in which non-linearities are reduced.

18. The apparatus of claim 16 further comprising a notch filter for reducing energy in the non-information bearing portions of the signals before they are transmitted.

19. The apparatus of claim 18 comprising plural ones of said notch filter.

20. The apparatus of claim 16 wherein the non-information bearing portions are guard bands between channels carrying the information bearing portions.

* * * * *